(12) United States Patent
Kaul et al.

(10) Patent No.: US 11,726,922 B2
(45) Date of Patent: Aug. 15, 2023

(54) MEMORY PROTECTION IN HYPERVISOR ENVIRONMENTS

(71) Applicant: International Business Machines Corporation, Armonk, NY (US)

(72) Inventors: Akshar Kaul, Bangalore (IN); Krishnasuri Narayanam, Bangalore (IN); Ken Kumar, Meerut (IN); Pankaj S. Dayama, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 229 days.

(21) Appl. No.: 16/800,636

(22) Filed: Feb. 25, 2020

(65) Prior Publication Data

US 2021/0263858 A1  Aug. 26, 2021

(51) Int. Cl.
*G06F 12/1018* (2016.01)
*G06F 12/14* (2006.01)
(Continued)

(52) U.S. Cl.
CPC ........ *G06F 12/1018* (2013.01); *G06F 9/3861* (2013.01); *G06F 9/4401* (2013.01);
(Continued)

(58) Field of Classification Search
CPC .... G06F 9/3861; G06F 12/0811; G06F 21/79; G06F 9/44521; G06F 21/53; G06F 2009/45583; G06F 9/45545; G06F 12/1018; G06F 9/4555; G06F 12/1408; G06F 9/4401; G06F 9/45558; G06F 21/64; G06F 2212/651; G06F 2212/657; G06F 212/152; G06F 12/145; G06F 2212/1052; G06F 12/0897; G06F 12/109; G06F 2212/1032;
(Continued)

(56) References Cited

U.S. PATENT DOCUMENTS 4,126,894 A * 11/1978 Cronshaw ........... G06F 12/0862
                                                    711/E12.072
4,680,703 A *  7/1987 Kriz ...................... G06F 3/0601
                                                    711/112
(Continued)

OTHER PUBLICATIONS

Virtualization Technique, https://studylib.net/doc/5706655/shadow-page-table, accessed Feb. 14, 2020.
(Continued)

*Primary Examiner* — David Yi
*Assistant Examiner* — Zubair Ahmed
(74) *Attorney, Agent, or Firm* — Ryan, Mason & Lewis, LLP

(57) ABSTRACT

Methods, systems, and computer program products for memory protection in hypervisor environments are provided herein. A method includes maintaining, by a memory management layer of a hypervisor environment, a blockchain-based hash chain associated with a page table of the memory management layer, the page table corresponding to a plurality of memory pages; and verifying, by the first memory management layer, content obtained in connection with a read operation for a given one of the plurality of memory pages based at least in part on hashes maintained for the given memory page in the blockchain-based hash chain.

20 Claims, 11 Drawing Sheets

(51) Int. Cl.
  *G06F 21/64* (2013.01)
  *G06F 21/79* (2013.01)
  *H04L 9/06* (2006.01)
  *G06F 9/455* (2018.01)
  *G06F 9/445* (2018.01)
  *G06F 9/38* (2018.01)
  *G06F 9/4401* (2018.01)
  *G06F 12/0811* (2016.01)
  *H04L 9/00* (2022.01)

(52) U.S. Cl.
  CPC ........ *G06F 9/44521* (2013.01); *G06F 9/4555* (2013.01); *G06F 9/45545* (2013.01); *G06F 9/45558* (2013.01); *G06F 12/0811* (2013.01); *G06F 12/1408* (2013.01); *G06F 21/64* (2013.01); *G06F 21/79* (2013.01); *H04L 9/0637* (2013.01); *H04L 9/0643* (2013.01); *G06F 2009/45583* (2013.01); *H04L 9/50* (2022.05)

(58) Field of Classification Search
  CPC ... H04L 9/0643; H04L 9/3239; H04L 9/0637; H04L 2209/38
  USPC .................................................. 711/154, 100
  See application file for complete search history.

(56) References Cited

U.S. PATENT DOCUMENTS

| | | | |
|---|---|---|---|
| 6,467,025 B1* | 10/2002 | Taylor | G06F 12/0891 711/3 |
| 8,307,169 B2 | 11/2012 | Elteto | |
| 2009/0113425 A1* | 4/2009 | Ports | G06F 9/4881 718/1 |
| 2014/0281354 A1* | 9/2014 | Tkacik | G06F 21/64 711/206 |
| 2017/0300430 A1* | 10/2017 | Kataria | G06F 9/468 |
| 2019/0318063 A1* | 10/2019 | Wierzba | G06F 21/10 |

OTHER PUBLICATIONS

Li, Shih-Wei et al., Protecting Cloud Virtual Machines from Hypervisor and Host Operating System Exploits, 28th {USENIX} Security Symposium ({USENIX} Security 19). Aug. 16, 2019.

Tang, Weiwen et al., Secure and Efficient In-Hypervisor Memory Introspection Using Nested Virtualization, 2018 IEEE Symposium on Service-Oriented System Engineering (SOSE). IEEE, 2018, May 17, 2018, pp. 186-191.

Dubrulle, Paul, et al., Blind Hypervision to Protect Virtual Machine Privacy Against Hypervisor Escape Vulnerabilities Publication, 2015 IEEE 13th International Conference on Industrial Informatics (INDIN) IEEE, Oct. 1, 2015.

\* cited by examiner

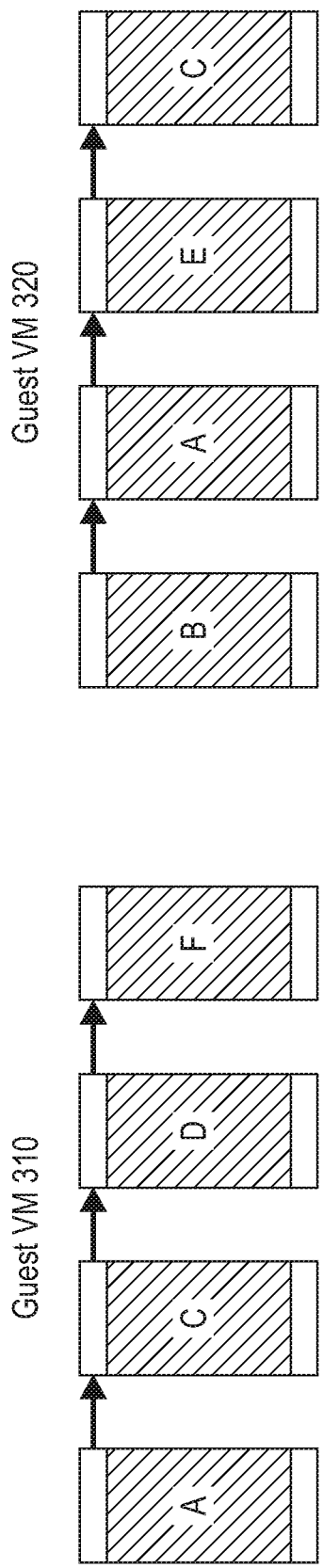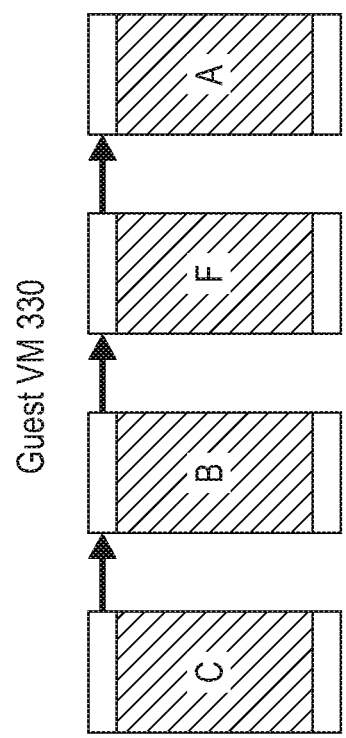
FIG. 3C
FIG. 3B
FIG. 3D

MEMORY PROTECTION IN HYPERVISOR ENVIRONMENTS

FIELD

The present application generally relates to information technology and, more particularly, to memory protection in hypervisor environments.

BACKGROUND

A hypervisor (also referred to as a Virtual Machine Monitor (VMM)) is software which creates and runs a virtual machine (VM). A native or bare metal hypervisor (referred to as a Type 1 hypervisor) runs directly on the host hardware, and provides the features needed by guests (such as I/O, for example). A hosted hypervisor (referred to as a Type 2 hypervisor) runs on an operating system as a process and uses the underlying features of the operating system. A host machine is a computer on which the hypervisor runs, and a guest machine is the virtual machine.

SUMMARY

In one embodiment of the present invention, techniques for memory protection in hypervisor environments are provided. An exemplary computer-implemented method includes maintaining, by a first one of a plurality of memory management layers of a hypervisor environment, at least one blockchain-based hash chain associated with a page table of the first memory management layer, the page table corresponding to a plurality of memory pages, wherein the at least one blockchain-based hash chain comprises, for each of the plurality memory pages: (i) a current hash associated with the memory page and (ii) a previous hash associated with an immediately preceding memory page corresponding to the page table; and verifying, by the first memory management layer, content obtained in connection with a read operation for a given one of the plurality of memory pages, wherein the verifying comprises at least: (i) checking that a hash of the obtained content matches the current hash maintained in the at least one blockchain-based hash chain for the given memory page, (ii) obtaining further content of the memory page associated with the page table that immediately precedes the given memory page, and (iii) checking that a hash of the further content matches the previous hash maintained in the at least one blockchain-based hash chain for the given memory page.

Another example of an embodiment includes a computer-implemented method comprising: maintaining, by a guest virtual machine in a hypervisor environment, at least one blockchain-based hash chain associated with a page table of the guest virtual machine; reading, by the guest virtual machine, a first page from a memory associated with the guest virtual machine in connection with a read operation; performing an integrity check of content of the first page, thereby protecting the memory associated with the guest virtual machine, wherein the integrity check is based at least in part on (i) a first hash in the at least one blockchain-based hash chain associated with the first page and (ii) a second hash in the at least one blockchain-based hash chain corresponding to a page immediately preceding the first page in the page table.

Another embodiment of the invention or elements thereof can be implemented in the form of a computer program product tangibly embodying computer readable instructions which, when implemented, cause a computer to carry out a plurality of method steps, as described herein. Furthermore, another embodiment of the invention or elements thereof can be implemented in the form of a system including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 3A-3E are diagrams illustrating a conceptual hypervisor memory layout in accordance with exemplary embodiments;

DETAILED DESCRIPTION

Figure 1:
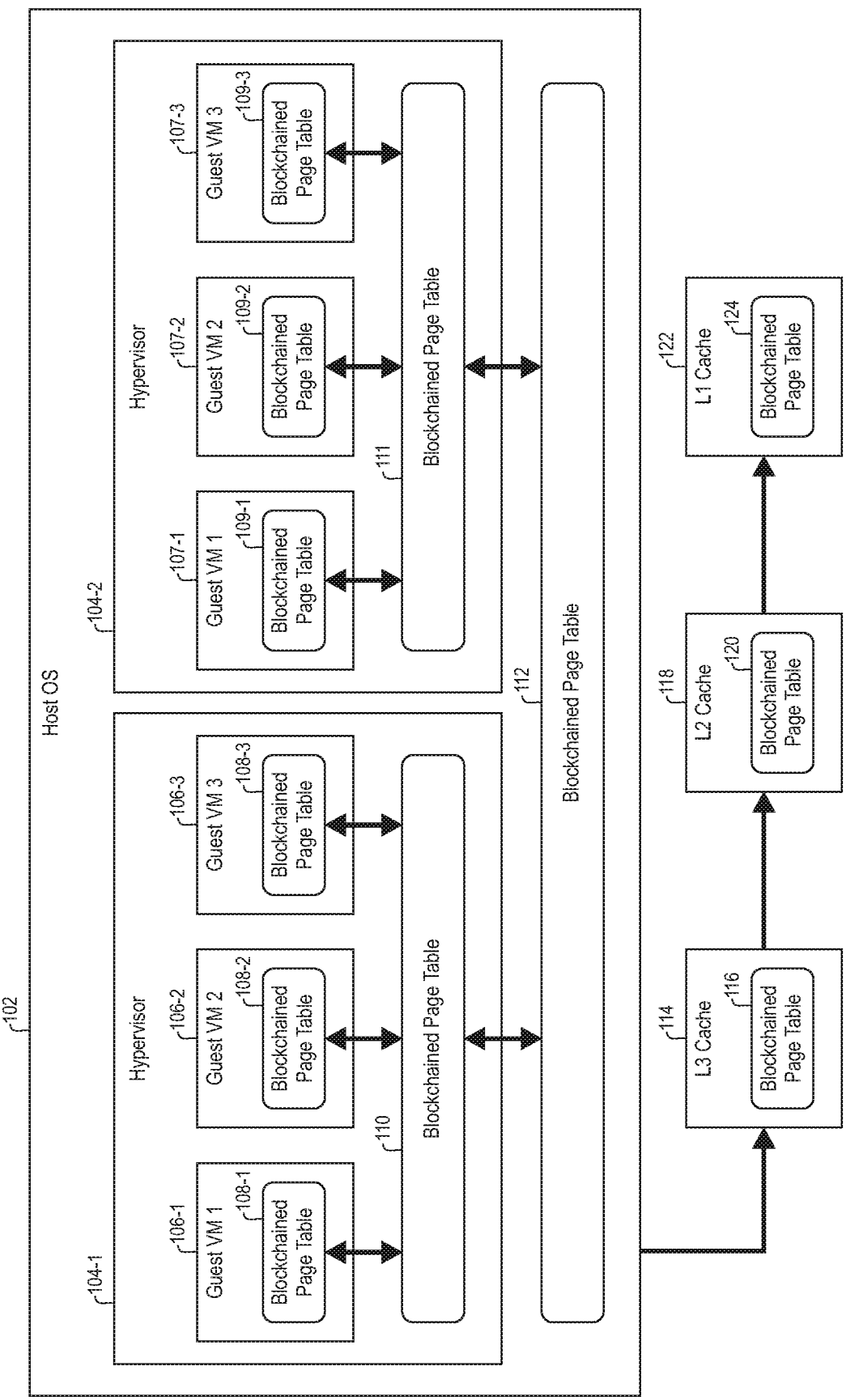
FIG. 1 is a diagram illustrating a system architecture according to an exemplary embodiment of the invention.

A hypervisor allows, for example, multiple guest VMs to share the host machine's physical compute resources such as processor cycles, memory space, network, etc. The guest operating system runs as a process on the host, and the hypervisor mediates access to physical resources across multiple VMs.

A hypervisor allows multiple guest VMs to share the host machine's physical compute resources, such as, for example, processor cycles, memory space, network, etc. The guest operating system runs as a process on the host, and the hypervisor mediates access to physical resources across multiple VMs. This allows the hypervisor to efficiently utilize the underlying hardware. The VMs are also independent of the underlying hardware, which makes it easier to migrate VMs. Additionally, the VMs are logically isolated from each other; thus errors, crashes and malware attacks on one VM do not extend to other VMs.

As noted herein, a hypervisor mediates access to physical resources across multiple VMs. Hypercalls refer to system calls from guest machines that are handled by the hypervisor. IO by a guest is handled by a set of interfaces provided by the hypervisor as part of its device emulation. Also, the hypervisor handles exceptions or traps within the guest VM.

Memory Management in Hypervisor

A hypervisor uses various techniques to manage memory between guest VMs that are hosted on a host machine. These techniques allow, for example, aggregate memory that is assigned to guest VMs to be greater than the physical memory available on the host.

For example, memory overcommit refers to a technique in which memory assigned to a guest VM is allowed to be greater than the physical memory available on the host (i.e., thin provisioning). By way of example, a host with 2 GB RAM can have a VM with 4 GB RAM assigned to it. The idea behind this technique is that VMs usually use less memory than is allocated to them. As such, the hypervisor divides the memory into shares, and tracks which shares the VMs are using, and which shares are idle. The hypervisor allows one or more VMs to use the unused shares assigned to other VMs as needed. In general, dynamic memory has the same effect as memory overcommit. In particular, a hypervisor may reclaim a portion of unused memory from one or more VMs and then redistribute the memory to other VMs that need it. An administrator of the hypervisor may configure memory of a VM at the start time, the maximum memory to be assigned to the VM, the amount of unused memory to be available to VM, etc.

Memory compression refers to a technique in which data in a memory page can be compressed to reduce storage requirements. Memory compression for main memory is generally not practical as too much processing overhead is required. Memory compression is used as a substitute for page swap files. The memory page to be swapped out is compressed, and the compressed page is put in a memory resident compression cache rather than on disk memory.

Ballooning refers to a memory reclamation technique that is used when a host is running low on memory. The host system is allowed to retrieve unused memory from certain guest VMs and share it with other VMs. The host uses balloon drivers running on VMs to determine how much memory it can take back from the VM. A balloon driver has to be installed on any VM that participates in ballooning. Balloon drivers obtain the target balloon size from the hypervisor and then inflate by allocating the proper number of guest physical pages within the VM. This process is known as "inflating the balloon," and the process of releasing the available pages is known as "deflating the balloon." VM memory ballooning can create performance problems.

Transparent page sharing (TPS) is a technique that is helpful when the same memory content is duplicated between VMs. Memory is divided into pages, and multiple guest VMs can have pages with exactly the same data. This can occur, for example, when VMs are running the same operating system, applications, and/or using the same datasets. Instead of storing the pages in separate frames (i.e., physical memory), a single copy is stored in the frame, and all the VMs point to the same frame. A copy on write mechanism is used such that when a VM tries to change the content of the page, a duplicate page is assigned, and changes are done with respect to the duplicate page. TPS identifies duplicate content through hash values of the memory pages. For example, all hashes may be held in a hash table, and if a hash match is found, byte level matching is performed. It is noted that VMs do not see this remapping. TPS generally allows greater memory over subscription than other techniques.

Memory Translation

Memory translation refers to a process in which a hypervisor runs a software-based memory management unit (MMU) that allocates a shadow page table for each VM. A guest VM cannot be given direct access to the hardware based MMU. A guest OS maps from a guest virtual address to a guest physical address using a guest page table. The hypervisor maps from a guest physical address to a host physical address using a hypervisor page table. There can also be other layers of translation depending on the setup (e.g., a host OS may map hypervisor pages to actual frames).

Hypervisor environments are susceptible to malicious behavior, such as, for example, hyperjacking, breaches to VM isolation, and VM escape attacks. A hyperjacking attack occurs when a hacker deploys malware and rootkits that install themselves as a hypervisor below the operating system. Another problem is that a guest VM may access its memory via hypervisor, and a malicious hypervisor can overwrite data of a memory page at any location. Breaches to VM isolation can occur due to, for example, rogue VMs, subversion of the isolation of memory pages and storage devices, vulnerabilities in the hypervisor design. A VM escape attack includes using Direct Memory Access (DMA) by a VM to overwrite the physical memory used by other VMs and processes. VM escape attacks can occur if the hypervisor does not use certain firmware features (or if the features are not available on the host system). Errors in the hypervisor memory management unit (MMU), such as, for example, a buffer overflow, can also lead to attacks. In some situations, an attacker may swap the VM physical address of two pages. Although a hypervisor can have its integrity measured at the system boot time, this does not prevent runtime attacks on the system. Thus, these type of attacks on memory are possible. In view of such memory protection problems, it is important to ensure that a guest VM's memory is protected since the guest VM accesses the memory via the hypervisor.

Some techniques to increase security use hardware to encrypt memory. For example, Secure Encrypted Virtualization (SEV) is a technique that uses one key per virtual machine to isolate guests and the hypervisor from one another. The keys are managed by a secure processor, and the hypervisor uses hardware virtualization instructions and communication with the secure processor to manage the appropriate keys in the memory controller. SEV allows the guest VM to indicate which pages in memory should be encrypted, and protects the memory content of the guest VM from the hypervisor. However, it is noted that SEV does not provide data integrity as the hypervisor can replace cipher text with random data.

The exemplary embodiments herein describe techniques for memory protection in hypervisor environments. Exemplary embodiments allow, for example, a guest VM to protect the integrity of its memory content from a hypervisor. One or more example embodiments allow a guest VM to detect if a hypervisor has changed its memory content. Additionally, one or more embodiments described herein provide both data integrity and data confidentiality in situations where additional hardware is available (such as, for example, in SEV). Exemplary embodiments described herein may be used by software at any layer to protect its memory from other software that is lower in the stack, i.e., software that is closer to the hardware (e.g., a hypervisor is able to protect its memory from a host OS).

Referring now to FIG. 1, this figure is a diagram illustrating a system architecture according to an exemplary embodiment of the invention. In the example shown in FIG. 1, a Host OS 102 hosts two hypervisors 104-1, 104-2 (collectively 104) and includes a blockchained page table 112. Hypervisor 104-1 includes three guest VMs 106-1, 106-2, 106-3 (collectively 106) and a blockchained page table 110, and hypervisor 104-2 also includes three guest VMs 107-1, 107-2, 107-3 (collectively 107) and a blockchained page table 111. In the FIG. 1 embodiment, each of the guest VMs 106, 107 include a corresponding blockchained page table 108-1 to 108-3 and 109-1 to 109-3, respectively.

The system architecture includes a L3 cache 114 that comprises a blockchained page table 116, a L2 cache 118 that comprises a blockchained page table 120, and a L1 cache 122 that comprises a blockchained page table 124.

Figure 2:
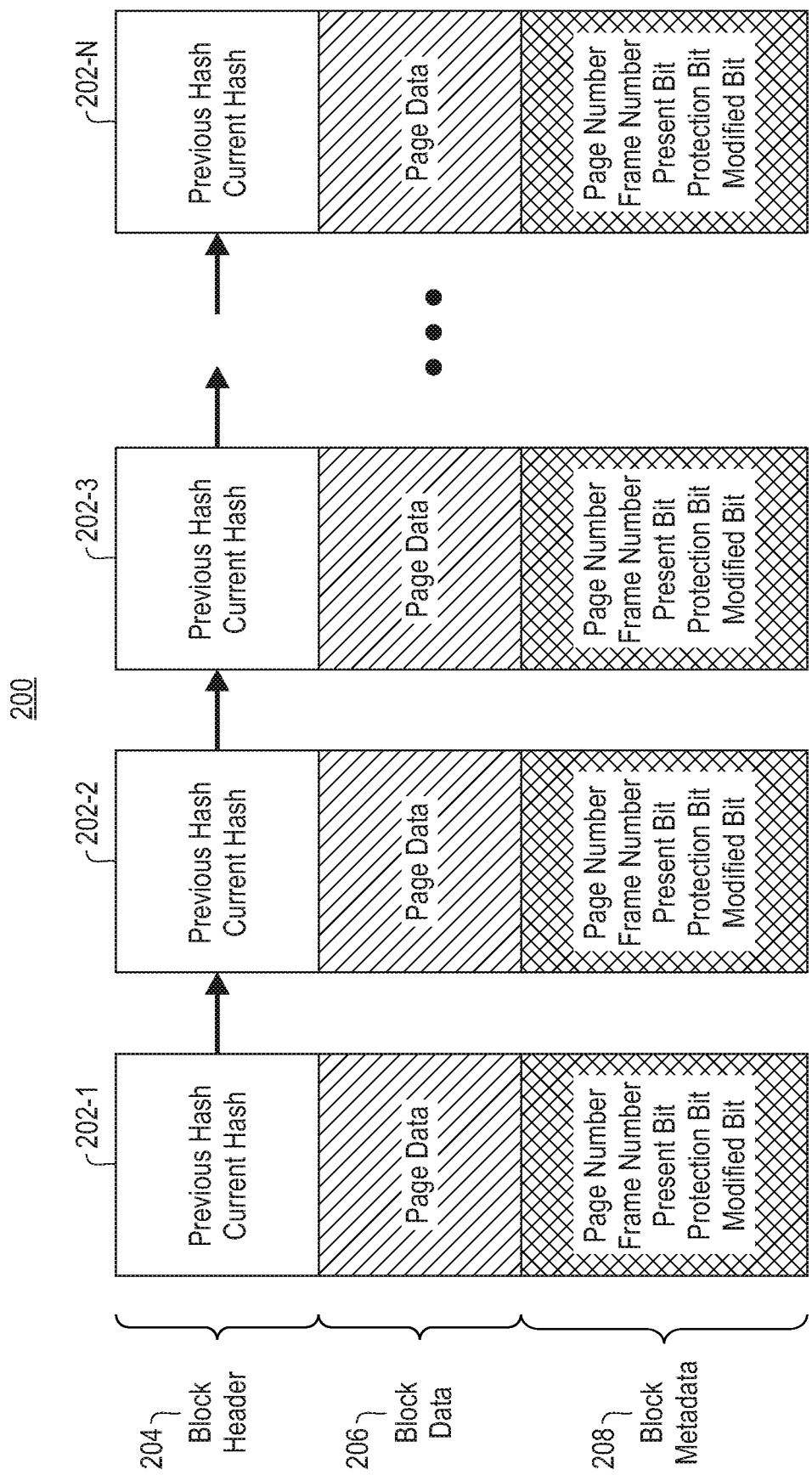
FIG. 2 is a diagram illustrating a conceptual guest VM memory layout in accordance with exemplary embodiments.

Referring now to FIG. 2, this figure shows an example of a VM memory layout 200 in accordance with exemplary embodiments. By way of example, the memory layout 200 depicted in FIG. 2 may correspond to a VM memory layout for VMs 106, 107. The VM layout 200 is in the form of a blockchain, in which the VM stores pages of its memory. More specifically, the memory layout 200 includes a number of blocks 202-1, 202-2, 202-3, ..., 202-N of a blockchain. Each block in the blockchain includes a block header 204, block data 206, and block metadata 208. The block header includes the hash of the previous block and the hash of the current block. The block data 206 include the page data of the VM, and the block metadata 208 include the metadata associated with a given page, such as, for example, a frame number assigned to the given page, a present/absent bit, a protection bit, a modified bit, etc.

According to one or more exemplary embodiments, the blockchain-based page hashes are implemented through a blockchained page table (such as, for example, one of the blockchained page tables depicted in FIG. 1). As an example, a page table typically includes fields for: page number, frame number, present bit, modified bit, and protection bit. The blockchained page table of a guest VM may be augmented with two additional fields, namely, fields for a current page hash and a previous page hash.

When a guest VM reads a page from memory, the guest VM will perform an integrity check on the content of the page. According to exemplary embodiments, a page read operation may include checking that the current hash in the page table matches the hash of the page content, obtaining the previous page in the page table, and checking that the hash of the previous page matches with the previous hash stored in page table. The number of previous pages to be checked may be configured (e.g., by a user) or can be assigned a default value. One or more exemplary embodiments may also include periodically checking the entire memory blockchain. Also, multiple small blockchains may be used instead of one single big chain, which can reduce the verification effort (i.e., keeping all the memory pages in a single hash chain in contrast to building multiple hash chains with each hash chain containing only subset of the memory pages). It is to be noted that smaller blockchains are less secure, and thus there is a tradeoff between reducing the verification effort and providing more security. All of the operations, such as, for example, hash verification, etc., are unlikely to become a bottleneck of the system because the required data are likely to be present in main memory (or in cache) because of the property of localization.

According to at least one exemplary embodiment, different chains may be maintained for different types of pages. For example, a blockchain may be maintained for read-only pages (such as application code blocks, operating system libraries, etc.), and another blockchain may be maintained for updateable pages. For read-only pages, the page data do not change, and thus, the pages are protected from malicious or inadvertent changes to the application logic due to, for example, vulnerabilities or bugs (such as a buffer overflow, for example). For updatable pages (such as, for example, pages containing application data, etc.), in response to a middle page being updated, hashes for subsequent pages may be recomputed. The hash chain for updateable pages may be updated when a page is updated. According to one or more exemplary embodiments, read-only pages may be part of longer hash chains while updatable pages may be part of shorter hash chains.

Figure 3A:
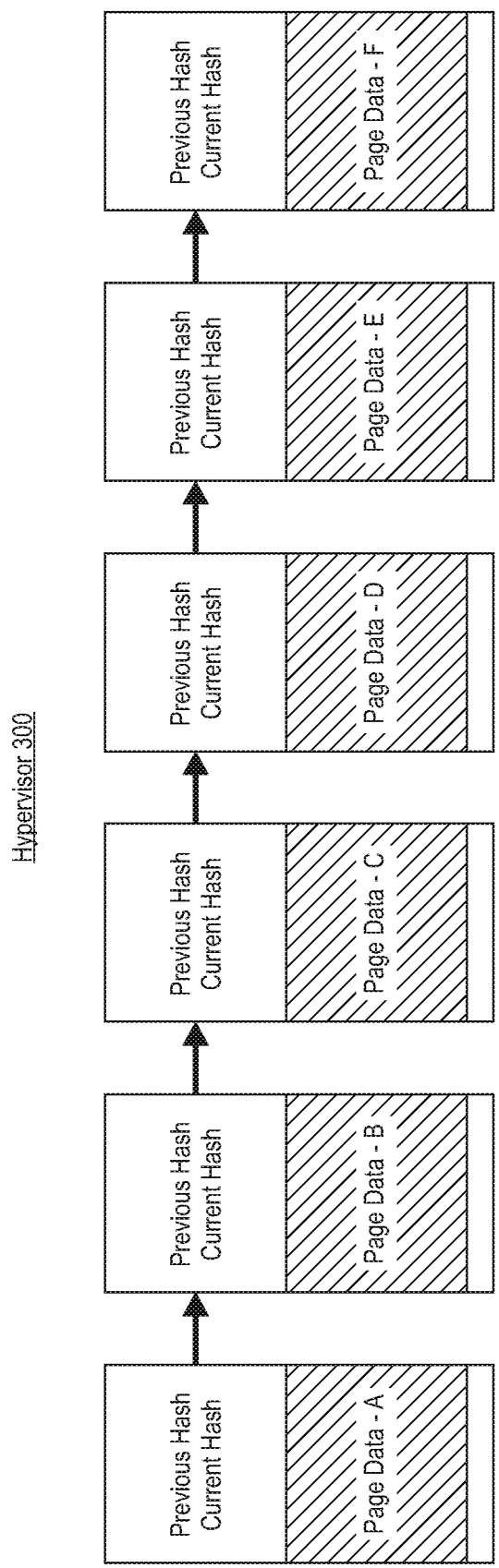

Referring now to FIGS. 3A-3E, these figures depict hypervisor memory management techniques in accordance with exemplary embodiments. FIG. 3A shows an example of TPS compatible hypervisor memory layout 300. In this example, the memory layout 300 shows six pages of data (i.e., data for pages A through F). Also, each block in the hypervisor memory layout 300 includes a block header comprising the hash of the previous block and the hash of the current block. FIG. 3B-3D show memory layouts for three guest VMs 310, 320, 330, respectively, that use the page data from hypervisor memory layout 300.

Figure 3E:
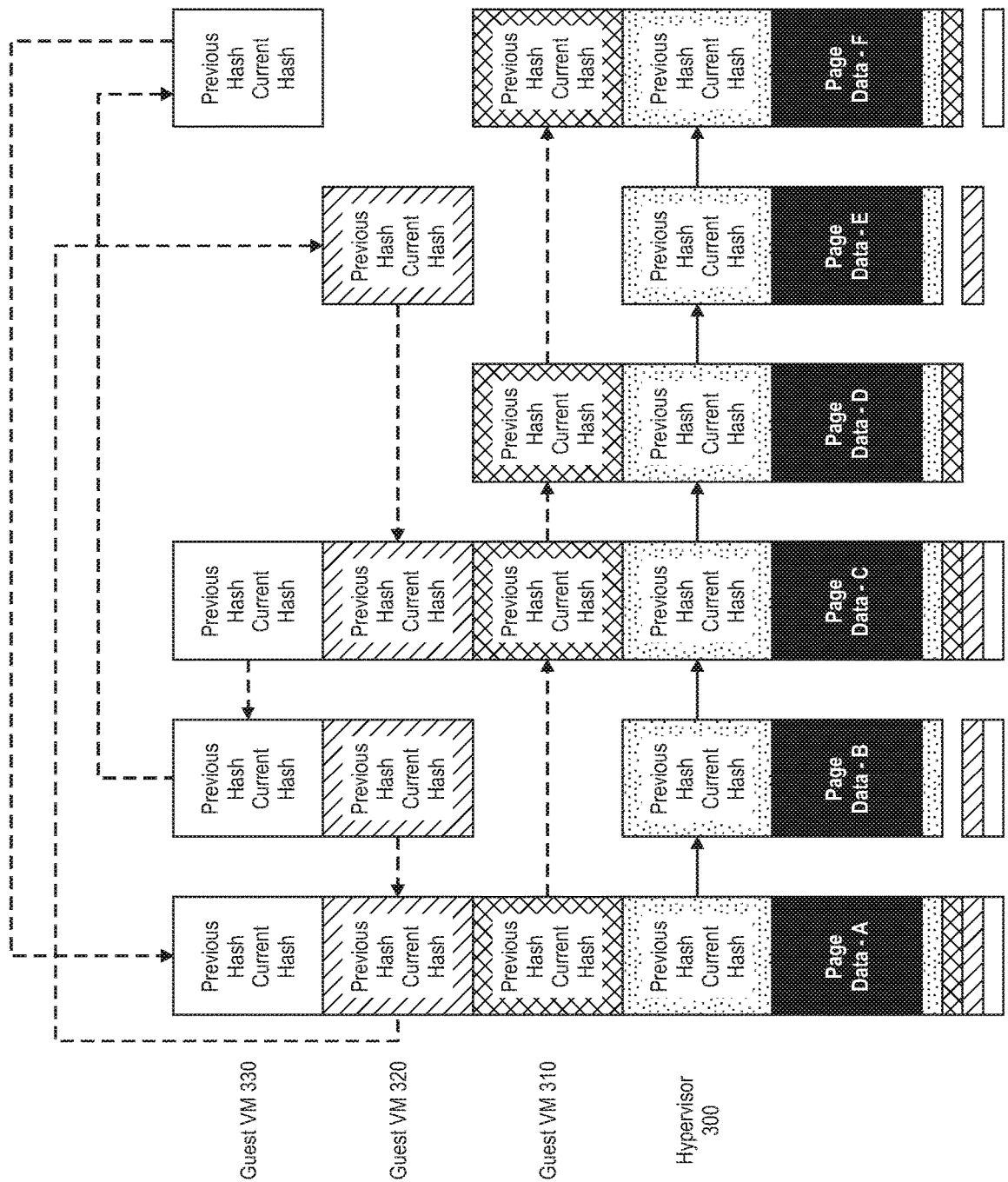

Referring also to FIG. 3E, this figure shows mappings between the memory of the guest VMs 310, 320, 330 and the memory layout 300 of the hypervisor. For example, the page order of the memory layout shown in FIG. 3B corresponding to guest VM 310 is A, C, D, F, and the dashed arrows in FIG. 3E show the mapping corresponding to this order in relation to the hypervisor memory layout 300.

According to an example embodiment, a guest VM performs an integrity check on the content of a page when the page is read from memory. For example, the integrity check may include checking that the current hash in the page table matches the hash of the page content. Next, the guest VM obtains the previous page and checks that its hash matches the value stored in page table. In one embodiment, the number of previous pages to be checked can be configured (e.g., by a user). Also, the entire memory blockchain may be checked periodically.

In one or more exemplary embodiments, different types of pages may be protected. For example, the techniques described herein may be applied to read-only pages (such as, for example, application code blocks, OS libraries etc.). For read-only pages, the page data do not change, and thus, any malicious or inadvertent change to the application logic by software bugs (such as a buffer overflow, for example) may be prevented.

According to at least one exemplary embodiment, updateable pages (such as pages containing application data, etc.) may also be protected. For updatable pages, some additional overhead is needed. For example, according to one example embodiment, if a page in the middle of blockchain is updated, then the hash for all subsequent pages in the blockchain has to be recomputed.

One or more exemplary embodiments includes maintaining different blockchains for read-only pages and updateable pages. One option for maintaining the blockchain for the updatable page is to update the hash chain when a given page is updated. In another option, multiple hash chains for the updateable pages are used instead of a single hash chain across the whole page table. As such, only the current hash chain needs to be updated when a page is updated. In an extreme case when the length of each chain is equal to one, then only the hash of the current page may be used. The length of the blockchains may be configured by an administrator based on, for example, a trust level (such as corresponding to confirmations from users of a VM that the expected code is being used, as opposed to, for example, code that has been injected with malicious code).

The techniques described herein are generic and can be used in different contexts. As an example, the techniques can be used by a hypervisor to protect the hypervisor page table. This protects, for example, hypervisor routing (such as interrupt handler, etc.) from a rogue VM. The techniques may also be applied by the host OS, and can be leveraged at one or more of the L1/L2/L3 cache level. As such, the embodiments described herein help an OS (or any software) to protect the integrity of its memory from the layers lower in the stack (closer to hardware). It is to be appreciated that such techniques are also compatible with existing memory management techniques used by the hypervisor (such as, for example, TPS, ballooning, etc.). Also, such techniques may be used to detect errors in memory content due to hardware issues.

In general, implementing the blockchain-based hashes with each memory page of the page table at a guest VM makes it more difficult for a malicious hypervisor to mount an attack. For example, to bypass the integrity checks, a malicious hypervisor would have to change the whole page table of the guest VM. More particularly, the malicious hypervisor will have to change all the pages subsequent to the page which is being tampered with. If multiple small chains have been used, then the malicious hypervisor has to change the entries in the effected chain alone. In contrast, for conventional techniques, a malicious hypervisor only needs to return wrong page data when the guest VM asks for it.

One or more exemplary embodiments utilize additional hardware for enhanced protection (such as, for example, a TPM (Trusted Platform Module), Intel SGX, or AMD SEV). Using this type of hardware makes it impossible for a hypervisor to tamper with a guest page table in a manner which cannot be detected by the guest VM. For example, to mount an attack, a malicious hypervisor would need to obtain the encryption of the data which it wants to write in the page. However, the keys are not accessible to the malicious hypervisor, and thus the page table cannot be created based on tampered data.

By way of example, for a guest VM, let the memory content to be stored be denoted P. In this case, P may be encrypted and stored in a frame using SEV. Next, the hash of P is calculated and stored in the page table. Now assume a malicious hypervisor wants to change the content from P to Q. The malicious hypervisor cannot obtain the encrypted value of Q from the SEV. Although the malicious hypervisor can store the hash of Q in the page table, this inconsistency is detectable by the guest VM.

The exemplary embodiments described herein may be implemented for hypervisor environments that use, for example, shadow paging, nested paging, or para-virtualization (if the guest OS has full access to its page table). It is also noted the techniques described herein are independent of how the frames are allocated to a virtual address. For example, at least some of the techniques merely require a list of virtual pages in some order and their content, and some place to store the hash chain. Further, it is noted that the guest cannot be allowed access to the hardware page tables because this would essentially allow the guest to have control of the machine.

Figure 4:
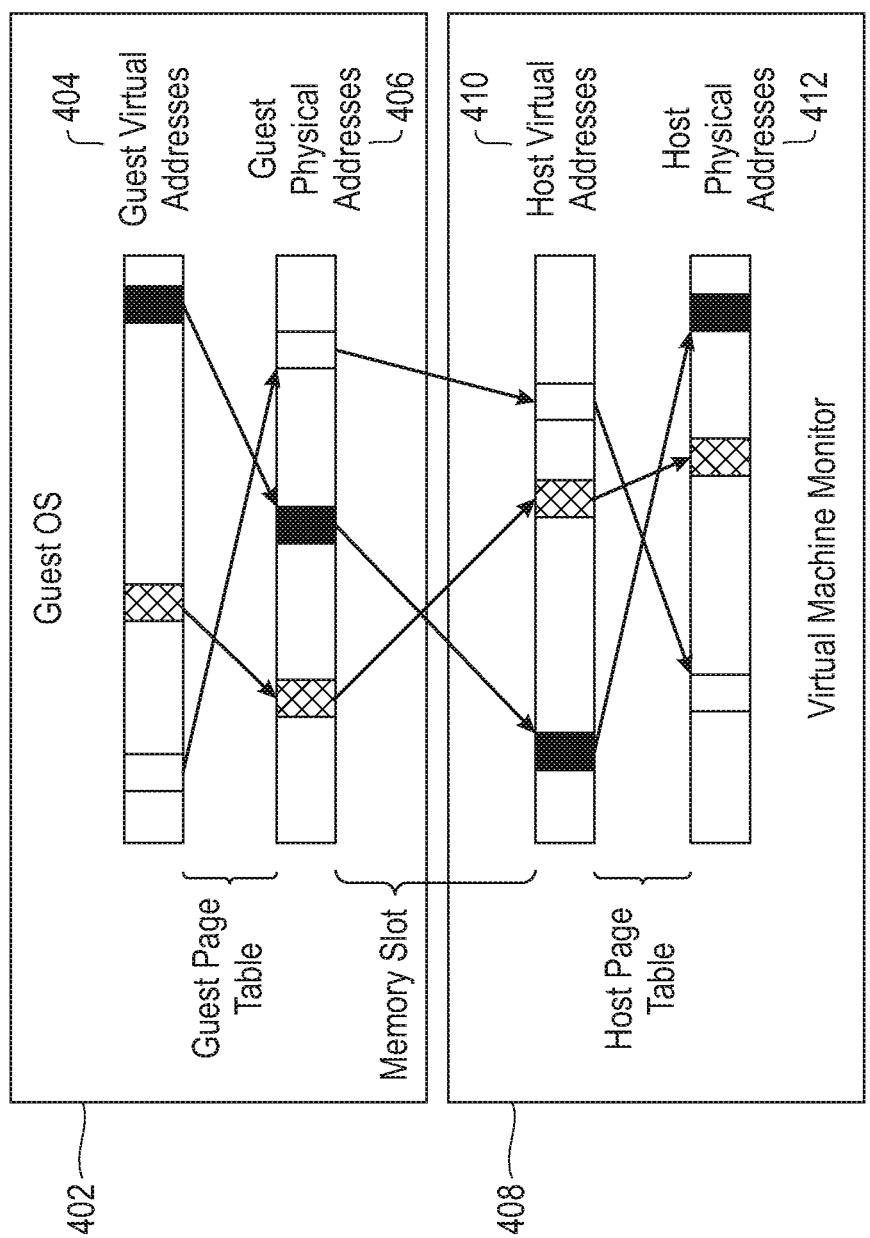
FIG. 4 shows an example of a non-shadowed page table in accordance with exemplary embodiments.

Referring to FIG. 4, this figure shows an example of a non-shadowed page table in accordance with exemplary embodiments. In this example, a guest OS 402 maintains a guest page table that maps guest virtual addresses 404 to guest physical addresses 406. The guest physical addresses 406 are mapped to host virtual addresses 410 of a virtual machine monitor (VMM) 408 as memory frames. A host page table provides the mapping between the host virtual addresses 410 and the host physical addresses 412.

Figure 5:
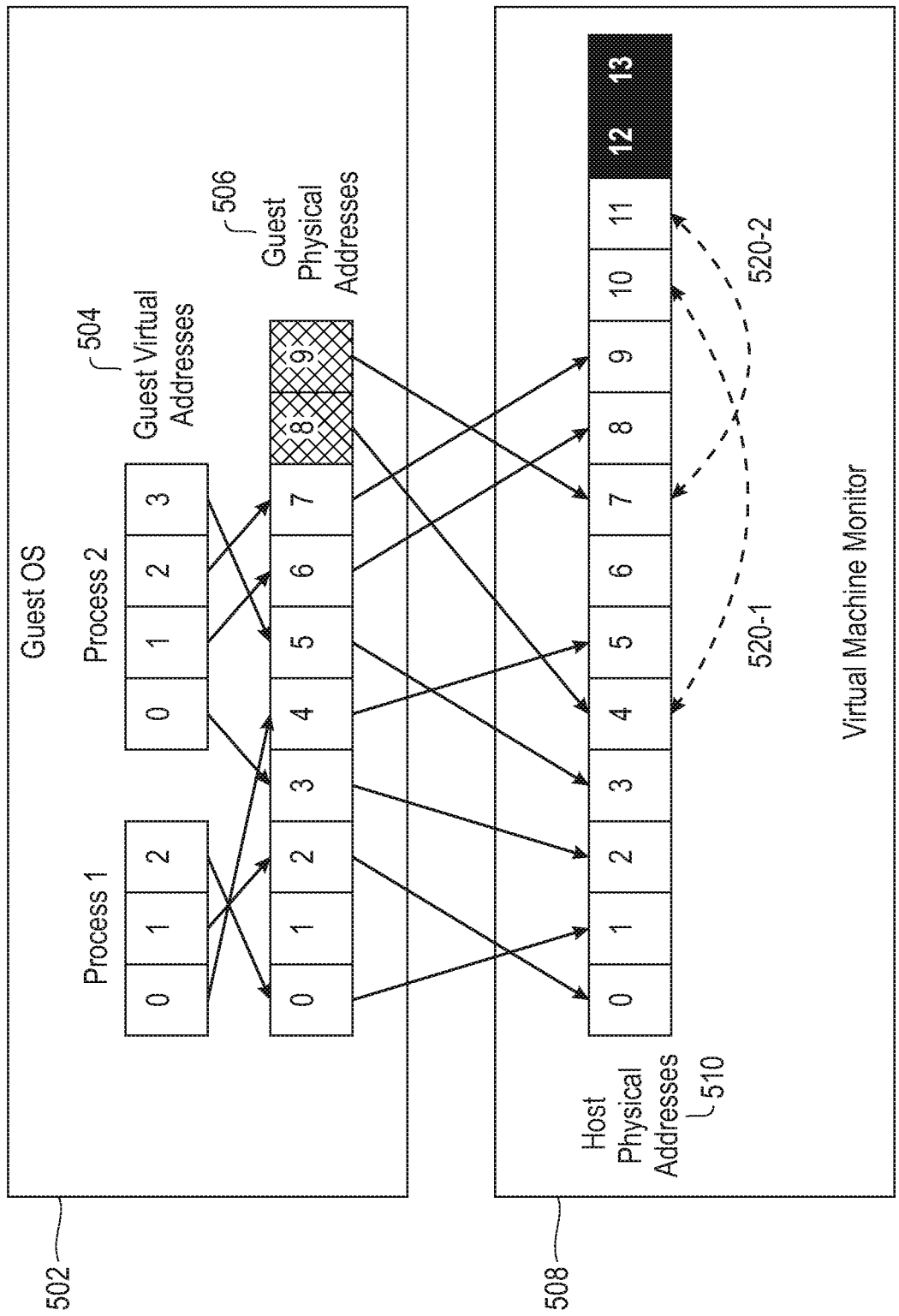
FIG. 5 shows an example of a shadowed page table in accordance with exemplary embodiments.

An embodiment that is compatible with a Shadow Page Table (SPT) includes the guest OS maintaining its own virtual memory page table in the guest physical memory frames, and this page table is used for creation of at least one hash chain. FIG. 5 shows one example of a SPT in accordance with exemplary embodiments. In this example, a guest OS 502 includes two processes (i.e., Process 1 and Process 2) associated with guest virtual addresses 504. The guest OS 502 maintains a guest page table (e.g., corresponding to frames 8 and 9 of the guest physical addresses 506). This guest page table maps the guest virtual addresses 504 to the guest physical addresses 506. Each physical memory frame of the guest OS 502 is mapped by the virtual machine monitor (VMM) 508 to a host physical memory frame corresponding to host physical addresses 510. The VMM 508 maintains the shadow page table (represented by dashed arrows 520-1, 520-2). The shadow page table map guest virtual pages directly to machine pages. Any modifications by the guest OS 502 to the virtual to physical tables are synced to the virtual to machine shadow page tables of the VMM 508. The VMM 508 applies write protection to all the physical frames of guest page tables in the host physical addresses 510, which leads to the guest page table write exception and trap to VMM 508 for further emulation through copy-on-write of the physical frame being updated by the guest OS 502.

In some example embodiments, the guest page table is used to create one or more blockchain-based hash chains. By way of example, the guest OS 502 may maintain a blockchain-based hash chain using an in-memory data structure which is separate from the guest page table. This data structure may include a virtual address, a current hash, and a previous hash. The guest OS 502 ensures that this data structure is in sync with guest page table. The hypervisor cannot directly access this data structure, and thus cannot tamper with the pages without being detected.

By way of example, in order to bypass the integrity checks of the guest VM, a malicious hypervisor would need to change the whole page table of the guest VM (more specifically, the hypervisor would need to change all the pages subsequent to the page which is being tampered with). To mount this attack, an adversary would require knowledge of the page tables maintained by the guest OS. This would require the adversary to have full knowledge of how the guest OS is managing its memory. This information is not trivial to obtain, but it is possible because hypervisor can see the raw memory used by the guest OS.

Exemplary embodiments described herein are also compatible with demand paging. Demand paging is a technique that brings pages in memory as and when they are needed, which leads to gaps in the pages that are mapped in the page table. According to an exemplary embodiment, one or more hash chains are built only on those memory pages which have been brought in memory, and their content is used for hash computation. In one option, the page table includes only those pages which have been brought in memory, and the hash chain is then built using these pages. It is noted that this option requires that entries in the page table are not sorted by virtual address but in the order in which they are brought in memory. In another option, the page table is augmented with two fields, namely, previous block virtual address and next block virtual address. These augmented fields are used as the links of the hash chain. This also makes it harder for the hypervisor to change the guest page table.

For demand paging, the memory access layer may perform the additional work of verifying the hash chain. The memory management unit's (MMU) task is to translate the virtual address to the physical address. For computing and verifying the hash chain, memory contents are needed as well. In an example embodiment, the memory access layer performs the additional work of verifying the hash chain. This verification may be performed at each memory fetch call with an MMU Hardware Change. For example, the MMU hardware may convert a given virtual address to the physical address by performing a page walk on the page table. When a page is fetched, the MMU refers to the page table to look for information related to the chain and fetches any pages that are needed to verify the integrity. Also, the verification may be performed by periodically checking the whole hash chain without MMU Hardware Change. For example, a separate kernel thread periodically performs the page walk (without the MMU), and verifies the integrity of each processes' page table. There are some attacks that are possible in these situations. For example, if an adversary replaces the page content with random data, then the semantic validity of the page will not be maintained. This type of attack can cause, for example, the application to crash or cause a random error, which can lead to denial of service (DoS) attacks. To launch a more meaningful attack on the guest VM, the adversary requires additional, non-trivial information, such as an understanding of how the guest OS is managing the memory in page tables and a semantic understanding of the memory contents in various pages.

One or more example embodiments include providing memory integrity for code pages and other read only pages. These pages may belong to, for example, critical sub systems such as booting sub routine, exception handlers, common procedures (such as DLL), etc. Exception handling routines typically do not perform an integrity check after the initial load. If the integrity of such a routine is violated it can lead to an attack on all the VMs managed by the hypervisor. According to one or more exemplary embodiments, such critical routines may be provided with run time memory integrity checks by checking the stored digest value at runtime.

As another example, enterprises are susceptible to snooping by administrators of a cloud when the enterprise uses virtual machines provided by cloud vendors. These cloud administrators can look at the memory of virtual machines, which may contain sensitive data. If the host system used by the cloud vendor has hardware (such as, for example, AMD SEV), the enterprise can use the hardware to protect its memory content from leaking to cloud administrators. However, a malicious cloud administrator can still put a garbage value into the memory used by virtual machines, which causes unexpected behavior (such as, for example, a system crash). The enterprise will not be able to figure out the reason for such a crash. One or more example embodiments allow such memory corruptions to be detected, and in general, allow the integrity of the memory content to be checked. According to one or more example embodiments, any malicious change to page content can be detected and appropriate action may then be taken.

Figure 6:
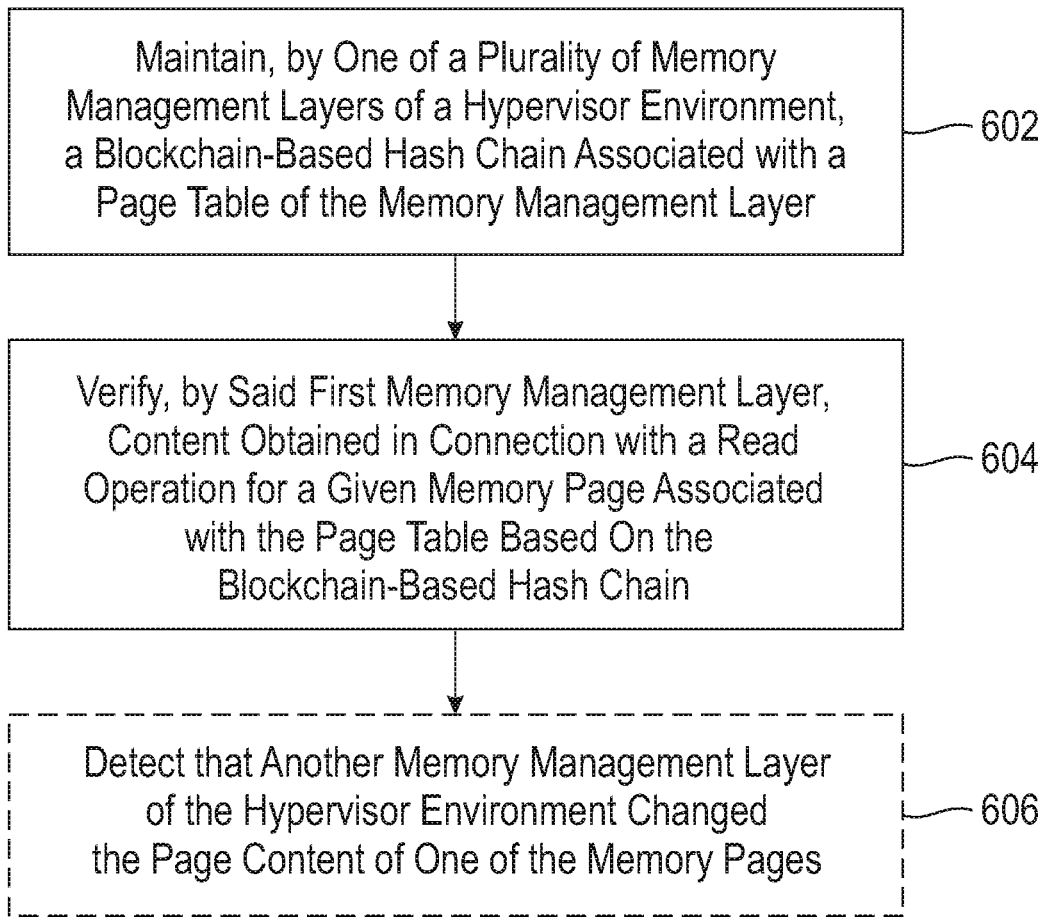
FIG. 6 is a flow diagram illustrating techniques according to an embodiment of the invention.

FIG. 6 is a flow diagram illustrating techniques according to an embodiment of the present invention. Step 602 includes maintaining, by a first one of a plurality of memory management layers of a hypervisor environment, at least one blockchain-based hash chain associated with a page table of the first memory management layer, the page table corresponding to a plurality of memory pages, wherein the at least one blockchain-based hash chain comprises, for each of the plurality memory pages: (i) a current hash associated with the memory page and (ii) a previous hash associated with an immediately preceding memory page corresponding to the page table. Step 604 includes verifying, by the first memory management layer, content obtained in connection with a read operation for a given one of the plurality of memory pages, wherein the verifying comprises at least: (i) checking that a hash of the obtained content matches the current hash maintained in the at least one blockchain-based hash chain for the given memory page, (ii) obtaining further content of the memory page associated with the page table that immediately precedes the given memory page, and (iii) checking that a hash of the further content matches the previous hash maintained in the at least one blockchain-based hash chain for the given memory page. Optionally, step 606 includes detecting, by the first memory management layer, that at least one other one of the plurality of memory management layers of the hypervisor environment changed the content of one of the memory pages associated with the first memory management layer.

The plurality of memory pages may include at least one of: (i) one or more read-only pages and (ii) one or more updateable pages. The at least one blockchain-based hash chain may include one or more first blockchain-based hash chains and one or more second blockchain-based hash chains. The maintaining in step 602 may include: maintaining the one or more first blockchain-based hash chains in the page table for the one or more read-only pages; and maintaining the one or more second blockchain-based hash chains for the one or more updatable pages, wherein the one or more first blockchain-based hash chains are mutually disjoint from the one or more second blockchain-based hash chains. The maintaining in step 602 may include updating at least one of the second blockchain-based hash chains in the page table in response to a change to page content of at least one of the updatable pages. The one or more updateable pages may include application data. The one or more read-only pages may include data corresponding to least one of (i) a booting subroutine, (ii) an exception handler, and (iii) a dynamic link library.

The plurality of memory management layers may include one or more other memory management layers that are lower than the first memory management layer in the hypervisor environment.

A further one of the plurality of memory management layers in the hypervisor environment may independently maintain one or more further blockchain-based hash chains to protect memory associated with the further memory management layer from at least one memory management layer of the hypervisor environment that is lower than the further memory management layer.

Each of the plurality of memory management layers may correspond to at least one of: (i) a host operating system, (ii) a guest virtual machine, (iii) a main memory, (iv) L1 Cache, (v) L2 Cache, and (vi) L3 cache.

The process depicted in FIG. 6 may include a step of periodically checking the integrity of the at least one blockchain-based hash chain in its entirety.

The first memory management layer may correspond to a guest virtual machine, and wherein maintaining the at least one blockchain-based hash chain protects memory associated with the guest virtual machine from one or more of: at least one other memory management layer of the hypervisor environment and at least one other memory management layer of the guest virtual machine.

The hypervisor environment may implement at least one of: (i) shadow paging, (ii) nested paging, and (iii) paravirtualization.

The process in FIG. 6 may include a step of preventing one or more types of memory attacks based at least in part on the at least one blockchain-based hash chain.

The process in FIG. 6 may include a step of utilizing specific hardware in conjunction with maintaining the at least one blockchain-based hash chain to protect confidentiality of memory contents associated with the first memory management layer from one or more of the other memory management layers of the hypervisor environment. The specific hardware may include a secure processor that manages keys for encrypting the memory contents of the memory associated with the first memory management layer.

Another example of an embodiment includes a computer-implemented method comprising: maintaining, by a guest virtual machine in a hypervisor environment, at least one blockchain-based hash chain associated with a page table of the guest virtual machine; reading, by the guest virtual machine, a first page from a memory associated with the guest virtual machine in connection with a read operation; performing an integrity check of content of the first page, thereby protecting the memory associated with the guest virtual machine, wherein the integrity check is based at least in part on (i) a first hash in the at least one blockchain-based hash chain associated with the first page and (ii) a second hash in the at least one blockchain-based hash chain corresponding to a page immediately preceding the first page in the page table.

The techniques depicted in FIG. 6 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 6 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Additionally, an embodiment of the present invention can make use of software running on a computer or workstation.

Figure 7:
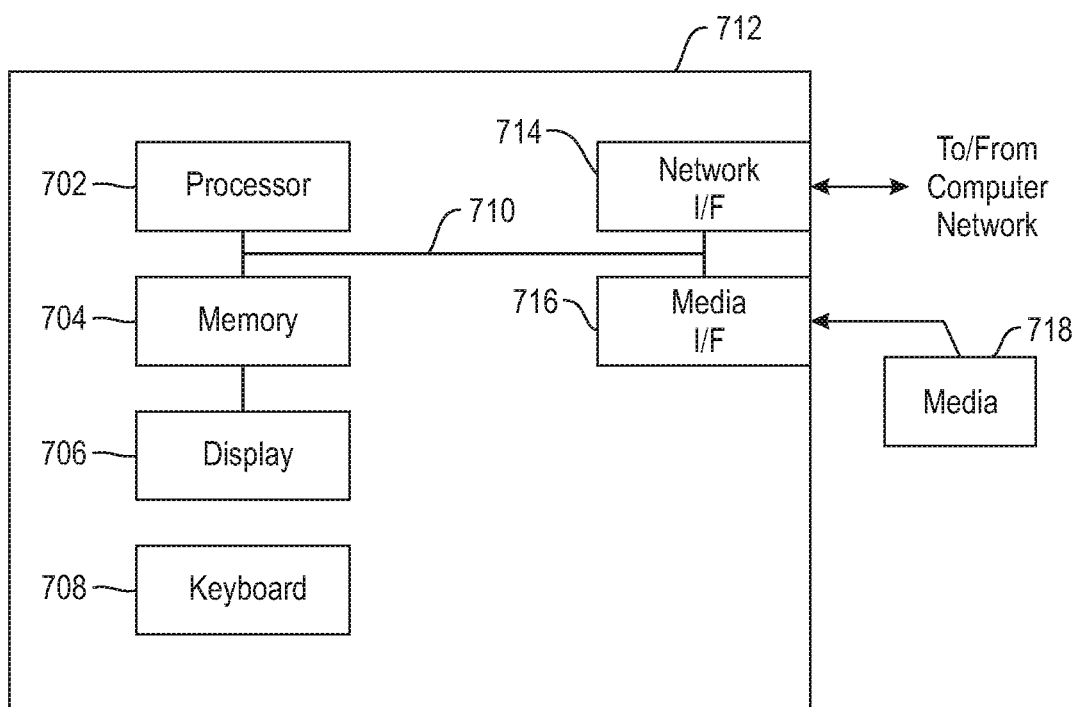
FIG. 7 is a system diagram of an exemplary computer system on which at least one embodiment of the invention can be implemented.

With reference to FIG. 7, such an implementation might employ, for example, a processor 702, a memory 704, and an input/output interface formed, for example, by a display 706 and a keyboard 708. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 702, memory 704, and input/output interface such as display 706 and keyboard 708 can be interconnected, for example, via bus 710 as part of a data processing unit 712. Suitable interconnections, for example via bus 710, can also be provided to a network interface 714, such as a network card, which can be provided to interface with a computer network, and to a media interface 716, such as a diskette or CD-ROM drive, which can be provided to interface with media 718.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 702 coupled directly or indirectly to memory elements 704 through a system bus 710. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 708, displays 706, pointing devices, and the like) can be coupled to the system either directly (such as via bus 710) or through intervening I/O controllers (omitted for clarity).

Network adapters such as network interface 714 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 712 as shown in FIG. 7) running a server program. It will be understood that such a physical server may or may not include a display and keyboard.

The present invention may be a system, a method, and/or a computer program product at any possible technical detail level of integration. The computer program product may include a computer readable storage medium (or media)

having computer readable program instructions thereon for causing a processor to carry out embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 702.

Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

Additionally, it is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 8:
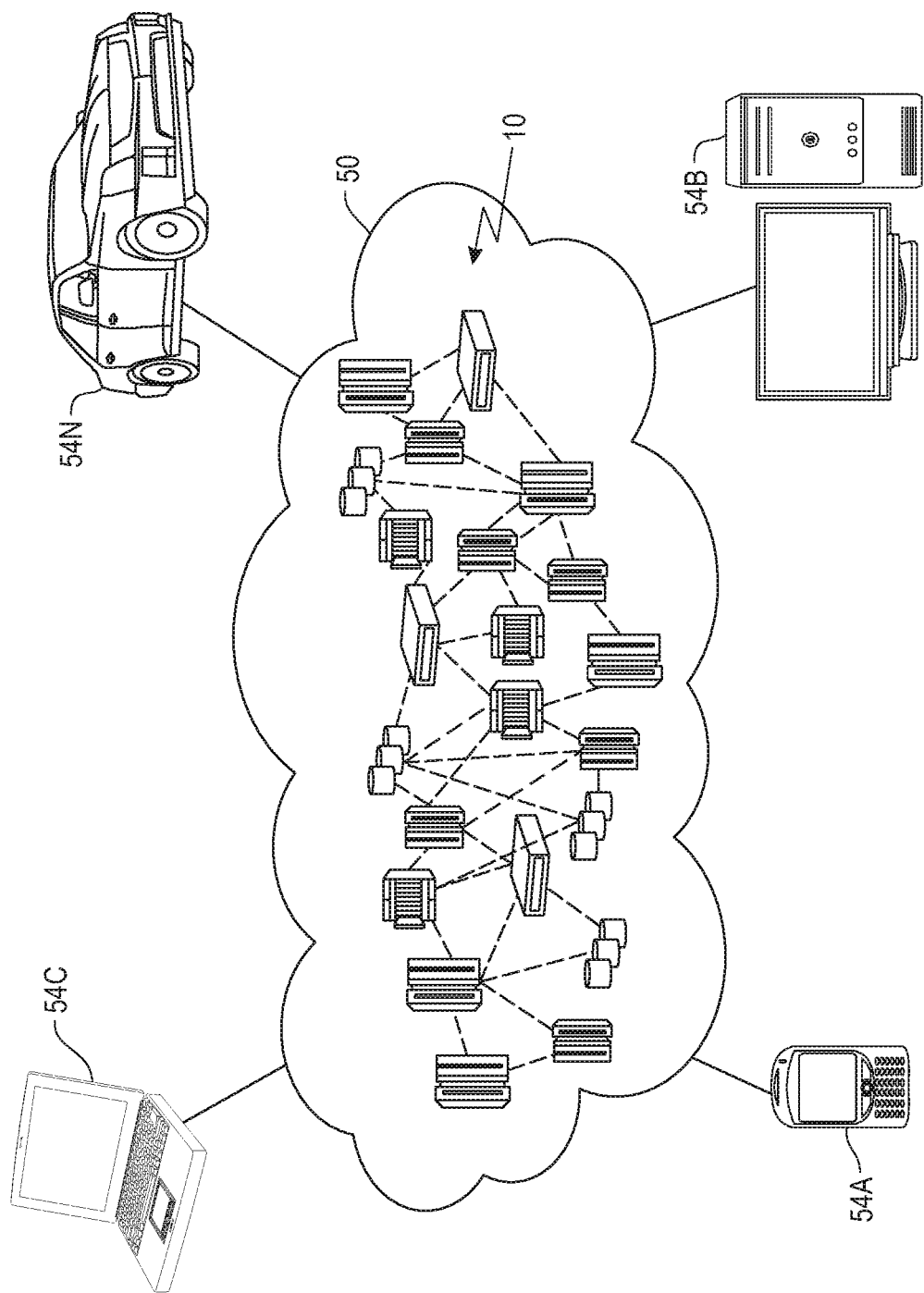
FIG. 8 depicts a cloud computing environment according to an embodiment of the present invention.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
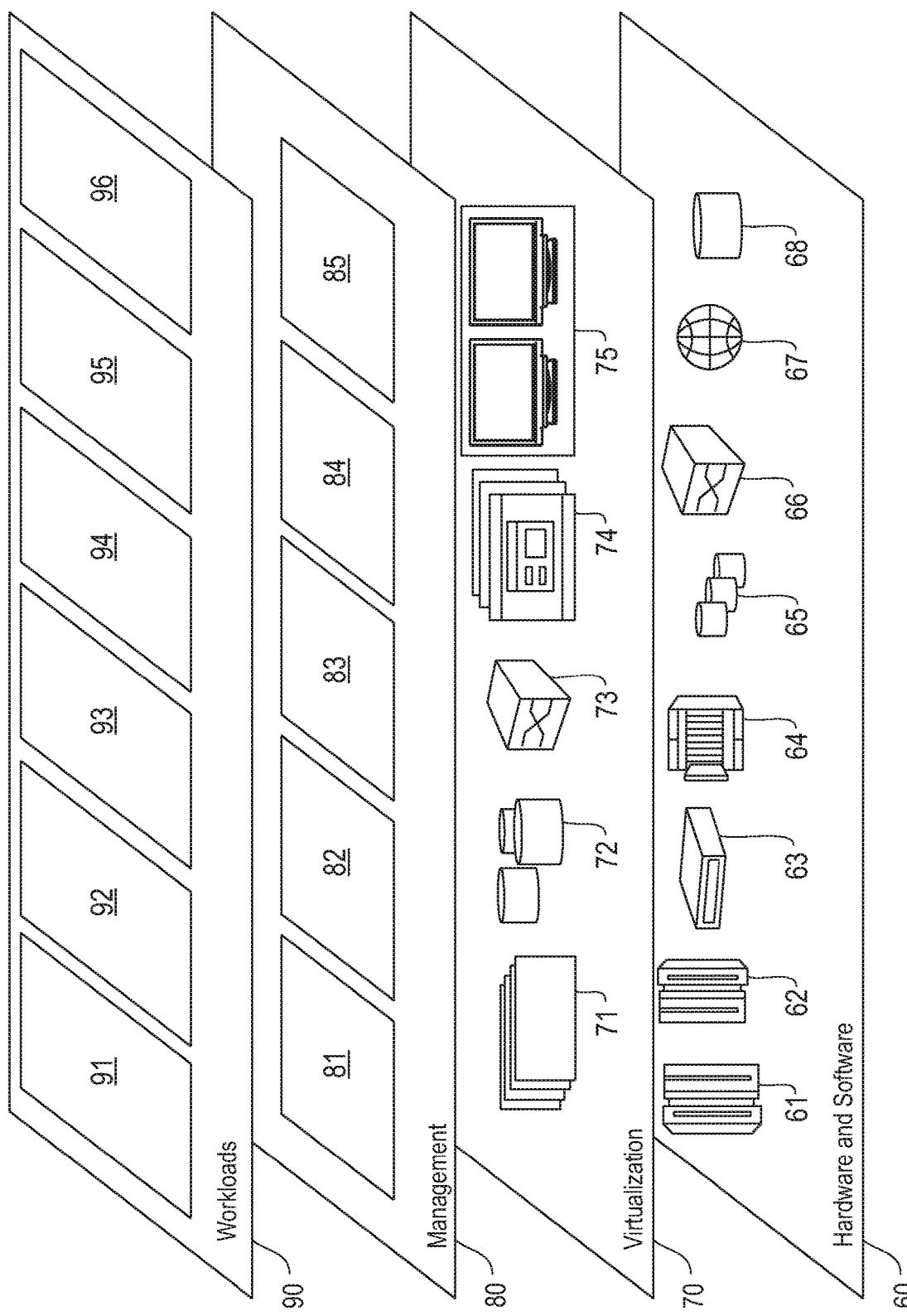
FIG. 9 depicts abstraction model layers according to an embodiment of the present invention.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and memory protection in hypervisor environments 96, in accordance with the one or more embodiments of the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present invention may provide a beneficial effect such as, for example, protecting the integrity of memory in hypervisor environments. At least one embodiment of the present invention may also provide a beneficial effect such as, for example, allowing a guest VM to detect if a hypervisor has changed its memory content.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, the method comprising:

maintaining, by a first one of a plurality of memory management layers of a hypervisor environment, at least one blockchain-based hash chain associated with a page table of the first memory management layer, the page table corresponding to a plurality of memory pages, wherein the at least one blockchain-based hash chain comprises a block for each of the plurality of memory pages, each block comprising: a current hash associated with the memory page; and a previous hash associated with an immediately preceding memory page corresponding to the page table, and wherein the blocks of the at least one blockchain-based hash chain are maintained in an order in which the plurality of memory pages in the page table are brought into memory;

verifying, by the first memory management layer in response to a read operation, content obtained in connection with the read operation for a given one of the plurality of memory pages, wherein said verifying comprises at least: checking that a hash of the obtained content matches the current hash of the block maintained in the at least one blockchain-based hash chain for the given memory page; obtaining further content of the memory page associated with the page table that immediately precedes the given memory page; and checking that a hash of the further content matches the previous hash of the block maintained in the at least one blockchain-based hash chain for the given memory page; and detecting, by the first memory management layer, that at least one other one of the plurality of memory management layers of the hypervisor environment changed the content of one of the memory pages associated with the first memory management layer based at least on the least one blockchain-based hash chain, wherein the at least one other memory management layer is functionally closer to hardware resources than the first memory management layer in a software stack;

wherein the method is carried out by at least one computing device.

2. The computer-implemented method of claim 1, wherein the plurality of memory pages comprise at least one of: one or more read-only pages; and one or more updateable pages.

3. The computer-implemented method of claim 2, wherein the at least one blockchain-based hash chain comprises one or more first blockchain-based hash chains and one or more second blockchain-based hash chains, and wherein said maintaining comprises:

maintaining the one or more first blockchain-based hash chains in the page table for the one or more read-only pages; and maintaining the one or more second blockchain-based hash chains for the one or more updatable pages, wherein the one or more first blockchain-based hash chains are mutually disjoint from the one or more second blockchain-based hash chains.

4. The computer-implemented method of claim 3, wherein said maintaining comprises:

updating at least one of the second blockchain-based hash chains in the page table in response to a change to page content of at least one of the updatable pages.

5. The computer-implemented method of claim 2, wherein the one or more updateable pages comprise application data.

6. The computer-implemented method of claim 2, wherein the one or more read-only pages comprise data corresponding to least one of: a booting subroutine; an exception handler; and a dynamic link library.

7. The computer-implemented method of claim 1, wherein the plurality of memory management layers comprises multiple memory management layers that are functionally closer to the hardware resources than the first memory management layer in the hypervisor environment.

8. The computer-implemented method of claim 1, wherein a further one of the plurality of memory management layers in the hypervisor environment independently maintains one or more further blockchain-based hash chains to protect memory associated with the further memory management layer from at least one memory management layer of the hypervisor environment that is functionally closer to the hardware resources than the further memory management layer.

9. The computer-implemented method of claim 1, wherein each of the plurality of memory management layers corresponds to at least one of: a host operating system; a guest virtual machine; a main memory; L1 Cache; L2 Cache; and L3 cache.

10. The computer-implemented method of claim 1, comprising:

periodically checking the integrity of the at least one blockchain-based hash chain in its entirety.

11. The computer-implemented method of claim 1, wherein the first memory management layer corresponds to a guest virtual machine, and wherein maintaining the at least one blockchain-based hash chain protects memory associated with the guest virtual machine from one or more of: at least one other memory management layer of the hypervisor environment; and at least one other memory management layer of the guest virtual machine.

12. The computer-implemented method of claim 1, wherein the hypervisor environment implements at least one of: shadow paging; nested paging; and para-virtualization.

13. The computer-implemented method of claim 1, comprising:

preventing one or more types of memory attacks based at least in part on the at least one blockchain-based hash chain.

14. The computer-implemented method of claim 1, comprising:

utilizing specific hardware in conjunction with maintaining the at least one blockchain-based hash chain to protect confidentiality of memory contents associated with the first memory management layer from one or more of the other memory management layers of the hypervisor environment.

15. The computer-implemented method of claim 14, wherein the specific hardware comprises a secure processor that manages keys for encrypting the memory contents of the memory associated with the first memory management layer.

16. A computer program product comprising a computer readable storage medium having program instructions embodied therewith, the program instructions executable by a computing device to cause the computing device to:

maintain, by a first one of a plurality of memory management layers of a hypervisor environment, at least one blockchain-based hash chain associated with a page table of the first memory management layer, the page table corresponding to a plurality of memory pages, wherein the at least one blockchain-based hash chain comprises a block for each of the plurality memory pages, each block comprising: a current hash associated with the memory page; and a previous hash associated with an immediately preceding memory page corresponding to the page table, and wherein the blocks of the at least one blockchain-based hash chain are maintained in an order in which the plurality of memory pages in the page table are brought into memory;

verify, by the first memory management layer in response to a read operation, content obtained in connection with the read operation for a given one of the plurality of memory pages, wherein said verifying comprises at least: checking that a hash of the obtained content matches the current hash of the block maintained in the at least one blockchain-based hash chain for the given memory page; obtaining further content of the memory page associated with the page table that immediately precedes the given memory page; and checking that a hash of the further content matches the previous hash of the block maintained in the at least one blockchain-based hash chain for the given memory page; and to detect, by the first memory management layer, that at least one other one of the plurality of memory management layers of the hypervisor environment changed the content of one of the memory pages associated with the first memory management layer based at least on the least one blockchain-based hash chain, wherein the at least one other memory management layer is functionally closer to hardware resources than the first memory management layer in a software stack.

17. The computer program product of claim 16, wherein the plurality of memory pages comprise at least one of: one or more read-only pages; and one or more updateable pages.

18. The computer program product of claim 17, wherein the at least one blockchain-based hash chain comprises one or more first blockchain-based hash chains and one or more second blockchain-based hash chains, and wherein said maintaining comprises:

maintaining the one or more first blockchain-based hash chains in the page table for the one or more read-only pages; and maintaining the one or more second blockchain-based hash chains for the one or more updatable pages, wherein the one or more first blockchain-based hash chains are mutually disjoint from the one or more second blockchain-based hash chains.

19. A system comprising:

a memory; and at least one processor operably coupled to the memory and configured for:

maintaining, by a first one of a plurality of memory management layers of a hypervisor environment, at least one blockchain-based hash chain associated with a page table of the first memory management layer, the page table corresponding to a plurality of memory pages, wherein the at least one blockchain-based hash chain comprises a block for each of the plurality memory pages, each block comprising: a current hash associated with the memory page; and a previous hash associated with an immediately preceding memory page corresponding to the page table, and wherein the blocks of the at least one blockchain-based hash chain are maintained in an order in which the plurality of memory pages in the page table are brought into memory;

verifying, by the first memory management layer in response to a read operation, content obtained in connection with the read operation for a given one of the plurality of memory pages, wherein said verifying comprises at least: checking that a hash of the obtained content matches the current hash of the block maintained in the at least one blockchain-based hash chain for the given memory page; obtaining further content of the memory page associated with the page table that immediately precedes the given memory page; and checking that a hash of the further content matches the previous hash of the block maintained in the at least one blockchain-based hash chain for the given memory page; and detecting, by the first memory management layer, that at least one other one of the plurality of memory management layers of the hypervisor environment changed the content of one of the memory pages associated with the first memory management layer based at least on the least one blockchain-based hash chain, wherein the at least one other memory management layer is functionally closer to hardware resources than the first memory management layer in a software stack.

20. A computer-implemented method, the method comprising:

maintaining, by a first one of a plurality of memory management layers of a hypervisor environment, at least one blockchain-based hash chain associated with a page table of the first memory management layer, the page table corresponding to a plurality of memory pages, wherein the at least one blockchain-based hash chain comprises a block for each of the plurality of memory pages, each block comprising: a current hash associated with the memory page; and a previous hash associated with an immediately preceding memory page corresponding to the page table, and wherein the blocks of the at least one blockchain-based hash chain are maintained in an order in which the plurality of memory pages in the page table are brought into memory;

verifying, by the first memory management layer in response to a read operation, content obtained in connection with the read operation for a given one of the plurality of memory pages, wherein said verifying comprises at least: checking that a hash of the obtained content matches the current hash of the block maintained in the at least one blockchain-based hash chain for the given memory page; obtaining further content of the memory page associated with the page table that immediately precedes the given memory page; and checking that a hash of the further content matches the previous hash of the block maintained in the at least one blockchain-based hash chain for the given memory page; and detecting, by the first memory management layer, that at least one other one of the plurality of memory management layers of the hypervisor environment changed the content of one of the memory pages associated with the first memory management layer based at least on the least one blockchain-based hash chain;

wherein the method is carried out by at least one computing device.

\* \* \* \* \*